United States Patent [19]

Nelson et al.

[11] Patent Number: 5,787,201

[45] Date of Patent: Jul. 28, 1998

[54] HIGH ORDER FRACTAL FEATURE EXTRACTION FOR CLASSIFICATION OF OBJECTS IN IMAGES

[75] Inventors: Susan R. Nelson; Susan M. Tuovila, both of Panama City, Fla.

[73] Assignee: The United States of America as represented by the Secretary of the Navy, Washington, D.C.

[21] Appl. No.: 629,709

[22] Filed: Apr. 9, 1996

[51] Int. Cl.$^6$ .............................. G06K 9/62; G06K 9/36; G06K 9/46

[52] U.S. Cl. ............................... 382/224; 382/249

[58] Field of Search .................. 382/224, 270, 382/249, 108, 109

[56] References Cited

U.S. PATENT DOCUMENTS 4,789,933  12/1988  Chen et al. .............................. 382/128

OTHER PUBLICATIONS

Pentland, A., "Fractal-based description of natural scenes", Proceedings of the IEEE Computer Soc. Conf. on Computer Vision and Pattern Recognition, pp. 201–209, Jun. 19, 1983.

Chen, Daponte and Fox, "Fractal feature analysis and classification in medical imaging", IEEE Transactions on medical imaging. IEEE Transactions on medical imaging, vol. 8, No. 2, pp. 133–142, Jun. 1989.

Medioni, G.G. and Yasumoto, Y., "A note on using the fractal dimension for segmentation", Proc. of the workshop on computer vision: representation and control, pp. 25–30, Apr. 30, 1984.

*Primary Examiner*—Joseph Mancuso
*Assistant Examiner*—Ha Tran Nguyen
*Attorney, Agent, or Firm*—Harvey A. Gilbert; Kenneth W. Dobyns

[57] ABSTRACT

A method of identifying and classifying pre-detected target candidates in an image using pixel intensity and a fractalization process applied to the image. A raw analog image is digitized and normalized. The normalized pixel intensity content of the image is converted to fractal dimensions using a small and a large fractal box, sequentially. An array of special fractal features satisfying predetermined classification thresholds is prepared from the fractal dimensions for each box centered about each pre-detected target candidate in the image, thus classifying the detected objects as targets.

35 Claims, 8 Drawing Sheets

HIGH ORDER FRACTAL FEATURE EXTRACTION FOR CLASSIFICATION OF OBJECTS IN IMAGES

INTRODUCTION

The present invention relates to the classification of objects in images. The objects could be sought targets, non-targets, or image clutter. Specifically, the present invention relates to the discrimination between objects of specified characteristics, that is, targets, and non-targets. The invention may be used on any type of image in which a surface or scene can be represented by image pixel intensities. The invention employs a high order fractal-based classifier that calculates 8 features associated with areas of an image and uses the values and patterns of these features to differentiate targets from non-targets.

BACKGROUND OF THE INVENTION

The term fractal refers to classes of sets and surfaces which, due to their irregularity and/or fragmentation, possess non-integer (that is, real-valued) textural dimensions that exceed their topological dimensions. Many naturally occurring patterns and processes are more accurately modeled by fractals than by classical Euclidean surfaces. Some naturally occurring processes with irregular textures that have been successfully modeled using fractal properties are clouds, mountain terrain, and the sea bottom. Fractals were chosen for use in this classification method because it was assumed that man-made objects, like a mine, with its smooth surface and definite shape, will be less fractal-like in nature, thus producing different values for the calculated fractal features. This would make it easier to distinguish a mine from the natural sea bottom. This method does not look at only the fractal dimension and declare an object a target or non-target. It goes much further by looking at the distribution of several high order fractal features to differentiate targets from non-targets. High order refers to fractal features beyond the simple fractal dimension. For example, the fractal gradient (slope) is a first order feature, while the distribution sums Tsum and Dsum are second order features. This classification method is completely independent of the type of detector used to initially locate possible targets in an image.

DISCUSSION OF FRACTALS

As well as being characterized by real-valued fractal dimensions, fractal surfaces also possess the qualities of irregularity and self-similarity. Irregularity means that the surface cannot be defined by smooth boundaries and so the perimeter and surface area cannot be exactly measured or calculated. Self-similarity means that, over some range of measurement scales, each scaled piece of the surface displays the same form as the whole surface; that is, the appearance and statistical properties of the surface do not appreciably change. The measured perimeter and surface area are dependent on the resolution of the measuring instrument.

A two-dimensional image actually has two calculable fractal dimensions, one for each of its two topological dimensions. These two fractal dimensions correspond to the average variation in texture, or pixel intensity, in the x and y directions. (A pixel is defined as the smallest level of resolution in an image.) Each fractal dimension over a given image area should have a value between 2 and 3 if fractal characteristics are present. Although an image representing a physical surface has a third topological dimension, the height of physical structures, an image maps the surface with a two-dimensional snapshot that reduces three-dimensional geographical information, as well as target echoes and sensor and display related phenomena such as speckle, reverberation, quantization noise, and gain signals, into a single pixel intensity for each image portion. The spatial segmentation method of fractalization used in the embodiment of this invention uses a fractal dimension procedure that was adapted from the three-dimensional method presented by Pentland in the literature. (For other image types, other methods of calculating fractal dimension may be more appropriate.) Pentland's 3-D method of fractal dimension calculation is based on the proposition that an image's intensity variations are a good reflection of the roughness of the imaged surface and that, if the surface has fractal characteristics, then so will the image. The embodiment of this invention links Pentland's calculated fractal dimension to physical conditions found in two-dimensional images. While the embodiment described in this invention is two-dimensional, the same fractal properties discussed here also apply to one-dimensional curves and higher dimensional surfaces.

Referring to the Pentland 3-D method of fractal dimension derivation, a fractional Brownian process, $I(x)$, is one in which, for all x and $\Delta x$, $$Pr\left[\frac{I(x+\Delta x)-I(x)}{\|\Delta x\|^H} < y\right] = F(y) \tag{1}$$

where $F(y)$ is a cumulative distribution of a random variable $y$ and $0<H<1$. The increments of $I$ can be said to be statistically self-similar with parameter $H$; that is, $$I(x) - I(x_0) \text{ and } \frac{I(rx) - I(rx_0)}{r^H} \tag{2}$$

have the same statistical characteristics. Values of H near zero correspond to rough surfaces; values of H near one correspond to smooth surfaces. The variable r is a constant.

The statement of self-similarity is $$E(|\Delta I_{\Delta x}|)\|\Delta x\|^{-H} = E(|\Delta I_{\Delta x=1}|) \tag{3}$$

where $E\,|\Delta I_{\Delta x}|$ is the expected value of the change in intensity over $\Delta x$ pixel steps and $\|\Delta x\|$ is the norm of the n-dimensional vector $\Delta x$. If statistical self-similarity exists, then there is a real value of H for any given image region. Equation (3) may also be used to determine the value of H. Solving for H yields $$H = \frac{\log(E(|\Delta I_{\Delta x}|)) - \log(E(|\Delta I_{\Delta x=1}|))}{\log(\|\Delta x\|)} \tag{4}$$

The value of H may be thought of as a persistence factor with larger values of H corresponding to smoother surfaces. The fractal dimension, $D_f$, is then $$D_f = (D_t + 1) - H = 3 - H \tag{5}$$

where $D_t$ is the topological dimension of an image. The actual values calculated for $D_f$ will be influenced by the type and characteristics of an image. The value of $D_f$ will decrease as H increases, that is, the smoother the target the smaller the fractal dimension value. Dimensional values may be influenced by many factors, including achievable sensor resolution, the form of the signal used to create an image, display and image processing procedures applied to the signal, statistical distribution of noise components, the number of pixels comprising an imaged object, and the extent to which the image has fractal characteristics.

SUMMARY OF THE INVENTION

1. Prior Art and Novelty of This Invention

Although a fractal dimension value using a single fractal box size has been previously used as a feature in performing scene segmentation and object classification, the present invention goes much further than previous efforts in analyzing an image and classifying objects in an image by using several fractal features derived from two fractal box sizes. Unique aspects of this invention include:

1) Developing a second, intrinsic, fractalized image in which pixel intensity is proportional to the fractal dimension for a given box size. An intrinsic image is a derived image that no longer represents a directly observable quality, such as, relating pixel intensity to a brightness level. In this invention two fractalized images derived from two fractal box sizes have been used. Only the areas around detected object centers need to be fractalized.

2) Calculating the fractal dimension for two different box sizes (any number of sizes may be used but this embodiment uses two) and then calculating two high order first derivative quantities—the magnitude and direction of the gradient between the two fractal dimension values. For this embodiment the feature Sdim defines the small box fractal dimension and Bdim defines the big box fractal dimension. See Table 1. The feature Fdif defines the magnitude and direction of the gradient between Bdim and Sdim (Fdif=Bdim−Sdim). The reasoning behind this is that for a background area there will be less difference between the two gradient magnitudes than if one box contains a target or an edge. The direction of the gradient is important because a man-made object will have a steeper slope than an area of background or clutter. The direction indicates what type of structure lies beyond the gradient; that is, is the transition to an area of background, clutter, or a man-made object.

3) Calculating the high order second derivative fractal features Tsum, the small box fractal dimension distribution sum, and Dsum, the big box and small box fractal dimension difference distribution sum, are unique to this invention. These are used as a measure of the longevity, or sustainability of the target, that is, how long the fractal dimension continues to meet the definition of a target.

4) Tracking the values of fractal features across the image (or portion of the image) in order to make classification decisions based on the changing distribution of features across the image (or portion of the image).

5) Using a well defined training set to parameterize decision thresholds using knowledge of fractal feature values for targets of interest. Fractal features are computed for a groundtruthed training set of images containing both targets and non-targets and some additional background areas. Several passes are made until the best performance for separating target from non-target is achieved for the training set. The relative usefulness of different features and the precision of threshold values can then be tested using a second, previously unused, set of images.

2. Information Needed Before Running Classifier

Raw analog data using a side scan sonar is taken. The data is digitized and stored as pixel intensities. The digital data is then normalized. The normalized image is preprocessed by a detection method which identifies objects which have the characteristics of possible targets, or in this embodiment, are minelike. The output from the detection method is a list of center coordinates of detected objects. A set of known images, that is, whose groundtruth is known, is used to train the classification method and to set threshold limits. The fractal-based classification method then uses the center coordinates of identified objects in unknown images and classifies the objects as either targets, that is, mines in this embodiment, or as nontargets.

Analog side scan sonar data taken in the field is digitized. Each raw image is stored in a separate disk file as integer data valued between 0 and 255, inclusive. These values represent image pixel intensities, with 0 representing the minimum intensity and 255 representing maximum intensity. In terms of a grey scale, like that used for computer monitor displays, 0 is represented by black and 255 is represented by white. Sequential pings are aligned vertically along the y-axis, while range is stored horizontally along the x-axis. In this embodiment, 420 pings (one row of pixels each) represent time along the y-axis and 512 columns of pixels represent range along the x-axis. Each pixel represents a specific range/ping cell. The raw image file is read in a sequential ping-by-ping manner and the normalization method applied.

In this invention, normalized images must be used by the fractal method instead of unnormalized images. Normalization produces a consistent statistical background distribution of pixel intensities across each image in a data set while retaining targets of interest. Background normalization removes artifacts such as signal attenuation with range, the effects of gain functions, and transient events, while retaining target highlights and shadows. In an unnormalized sonar image, pixel intensity decreases with increasing range because of signal attenuation, or may vary because of applied time varying gain; closer ranges may exhibit a banding effect created by side lobes and ripples in the sonar vertical beam pattern. Normalization imposes consistency among all images in a data set, produces a more uniform background within an image, allows for uniform detection criteria, that is, thresholds, across an image, and allows comparisons to be made among the images in the set. The normalization method used in this embodiment is an energy detecting method.

The normalization method is applied to a digitized image in a sequential ping-by-ping manner. Sequential pings are aligned vertically along the y-axis while range is aligned horizontally along the x-axis. A moving arithmetic average over seven range cells (that is, seven pixels) is applied across all range cells in a ping, resulting in an assigned interim mean pixel intensity for each range cell (that is, each pixel). Automated gain control is performed on the image by maintaining a time history of all previously read pings in the form of a running mean for each range cell. A time constant is then applied that weights the mean intensity level at each range cell across all past pings more heavily than the mean for the current single ping. For each range cell in the ping, a new running mean is calculated. This continues for all pings in the image. The final normalized intensity level for each range/ping cell, that is, for each pixel, is an integer clipped between 0 and 255, inclusive. The desired mean background level for intensity is set at 35.

Detection may be defined as the discrimination of an object from its background and its designation as a potential target of interest that bears further investigation. An object is any region of the image that has a significantly higher signal-to-background ratio than the average background level of nearby areas of the image. The detector used in this embodiment was the Iterative Statistics method developed at Coastal Systems Station. (Reference 1). This detector is applied to side scan sonar images and recursively sorts the image pixels into background, target highlight, and target shadow pixels. The output of the detector is a list of center coordinates (range,ping listed as $X_c$, $Y_c$) of detected objects.

The target highlight detection method then identifies areas of the image that contain possible targets of interest. As many passes are made over the data as there are target class sizes to be considered. Both an intensity threshold and a pixel count threshold have to be satisfied for a detection to be declared. Data windows, whose sizes are determined by expected target sizes, are moved across the pixel data. The intensity of each pixel within the window is compared to an intensity threshold set at 10.7 dB over the average background intensity; if a pixel exceeds this threshold, the target pixel count is incremented by one. The pixel count threshold is derived from the expected target size and a worse case target orientation. It is set to the number of pixels required to cover approximately three fourths the length of the target. When this threshold is reached by the target pixel count, the object is declared a target and the center coordinates ($X_c$, $Y_c$) are stored.

This invention, a fractal-based classification method, works at finding only targets that it has been trained to find. Fractal feature values are studied for different classes of objects. In this embodiment the two classes are minelike targets and non-targets. To effectively use this method, a training session must be conducted on known target data, or groundtruth. The groundtruthed images should include many false targets as well as known targets and their locations. It is very important to carefully select a representative training set, that is, one which represents the full range of images in the entire data set, including various types of backgrounds, so that the method will be able to handle future unknown image sets. If not, the classification method will not find targets in the unknown images and the false target rate will be high.

Using the groundtruth data and background images, 8 fractal features are calculated. Using these calculated values as guides, appropriate threshold limits for each calculated feature are set. In some instances, the threshold will be a single value while in others it may be a range of values denoted by a minimum and maximum value. Classification thresholds are places where there appears to be a significant breakpoint between target and non-target values for each feature. This must be done carefully because if threshold limits are too liberal there will be a lot of false targets. If limits are too restrictive then the classifier will be overtrained on one specific training set and will not have good classification performance on future image sets. Once all thresholds have been given a value, the classification method is ready to be used on unknown images of the same type on which it was trained.

The invention described herein is a method that discriminates between objects of specified characteristics, or targets, and non-targets within a two-dimensional image. The method may be used on any type of image in which a surface or scene can be represented by image pixel intensities. Analog data is converted to digital 8-bit data and stored. The stored image is normalized and stored again. A detection method is used to find objects in the image that have characteristics like those of the sought target. The whole normalized image and a list of the center coordinates of identified target-like objects from the detector are passed to this invention, a fractal-based classification method. Areas of the image surrounding each detected object are fractalized using two fractal boxes, one small and one big. The sizes of the boxes depend on the size of the sought targets. The method then employs a fractal-based classifier that calculates 8 features, Sdim, Bdim, Fdif, Tsum, Dsum, Conf, Slope, and Perpix (Table 1), associated with the detected objects and uses the values and patterns of these features to classify objects as either targets or non-targets.

It is therefore an object of the present invention to provide a means for discriminating between objects of specified characteristics, that is, targets, and non-targets including background, for any image that can be represented by image pixel intensities.

It is further an object of the present invention to provide a means for determining the distributions of specific fractal properties, or features, in the vicinity of detected object centers.

It is thus another object of the present invention to provide a means for classifying the detected objects having said specific fractal properties in said images as being either a sought target or a non-target.

Further features, benefits and advantages of the invention will become more readily apparent from the following detailed description, when taken in conjunction with the accompanying drawings.

BRIEF DESCRIPTION OF THE DRAWINGS

FIG. 3 comprised of FIGS. 3A and 3B is the beginning of a simplified flow chart of this invention.

FIG. 5 comprised of FIGS. 5A and 5B is a detailed flow chart of part of FIG. 4.

DETAILED DESCRIPTION OF THE INVENTION

Fractalization occurs as follows: the center of a fractal box is placed at a certain position (x,y) on the image, the fractal dimension $D_f$ is calculated over all pixels falling within the box, and all pixels within the box are assigned that fractal dimension value. The x, y, or an average dimension value may be used as appropriate for the type of image. (This embodiment uses the average dimension value.) This process may be repeated multiple times for an image, with different fractal box sizes chosen for different predicted target sizes. Using a big box for fractalization produces targets with duller highlights as compared to using a small box for fractalization, because of the inclusion of more background, which lowers average pixel intensities in the vicinity of the target.

The choosing of fractal box sizes takes a certain amount of learning, or training. That is one of the reasons for running a training session on known images before running the classification method on unknown images. Trying different box sizes is the only way to know which box size is best at capturing the target and not capturing excessive amounts of background. Fractal box size is based on characteristics of the image data set (such as pixel resolution) and predicted target characteristics, such as size. Using a smaller box will retain much of the speckle and other noise that may contaminate an image but also retains more detail of imaged objects. Using a box that is bigger reduces the average intensity level of both imaged noise and imaged objects, resulting in less sharp object detail. Finding two (or more) separate dimensions for two fractal box sizes, Sdim and Bdim, and the magnitude of their dimensional differences, Fdif, yields valuable information about an image area. If the two fractal box sizes yield much the same fractal feature values, that is an indication the image in that area is fairly uniform and so the area is probably a background or other non-target area, because the set of small fractal boxes are composed of sizes sufficient to include expected targets. For this invention, invention, the small box size is 20 pixels in x and 16 pixels in y and the big box size is twice as large, i.e. 40 pixels in x and 32 pixels in y.

Fractal dimension by itself is not sufficient to successfully classify objects; in general, the more noise, clutter, and other problems within an image, the more features that are required to characterize areas of the image. Table 1 lists fractal features calculated in this invention. All feature values (except Features 1 and 2) are calculated using the fractalized image. Features 1 and 2 are the center coordinates ($X_c$, $Y_c$) of a detected object. These coordinates are passed to the classification method from a separate object detection program.

TABLE 1

FRACTAL FEATURES OF AN IMAGE AREA

| FEATURE NUMBER | FEATURE NAME | FEATURE DEFINITION |
|---|---|---|
| 1 | $X_c$ | Center of detected object in x direction |
| 2 | $Y_c$ | Center of detected object in y direction |
| 3 | Tsum | Small box fractal dimension distribution sum |
| 4 | Dsum | Big box and small box fractal dimension difference distribution sum |
| 5 | Fdif | Fractal dimension difference (big box fractal dimension - small box fractal dim.) |
| 6 | Slope | Average slope of small box fractal dimension in vicinity of detected object |
| 7 | Bdim | Big box fractal dimension |
| 8 | Sdim | Small box fractal dimension |
| 9 | Conf | Detected object confidence level based on strength of object |
| 10 | Perpix | Percentage of pixels within small fractal box above pixel intensity threshold |

Figure 1:
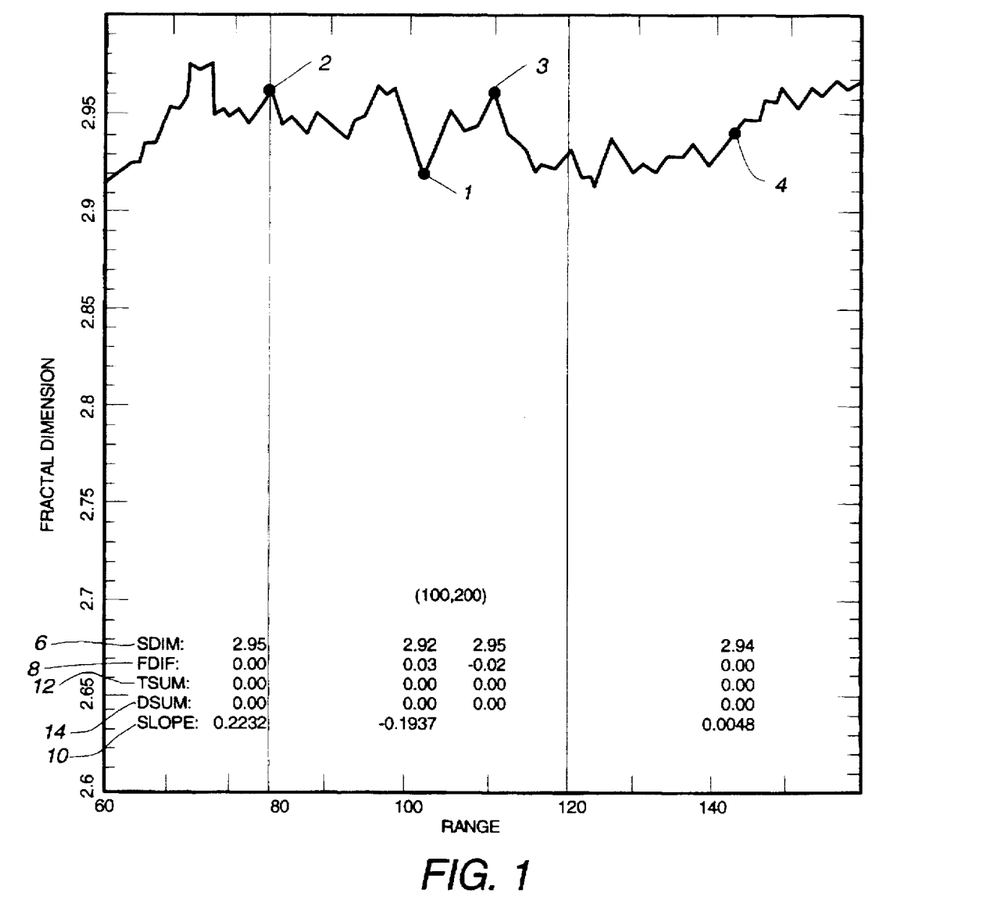
FIG. 1 shows the comparison of fractal features from four points across the background of an image.
Figure 2:
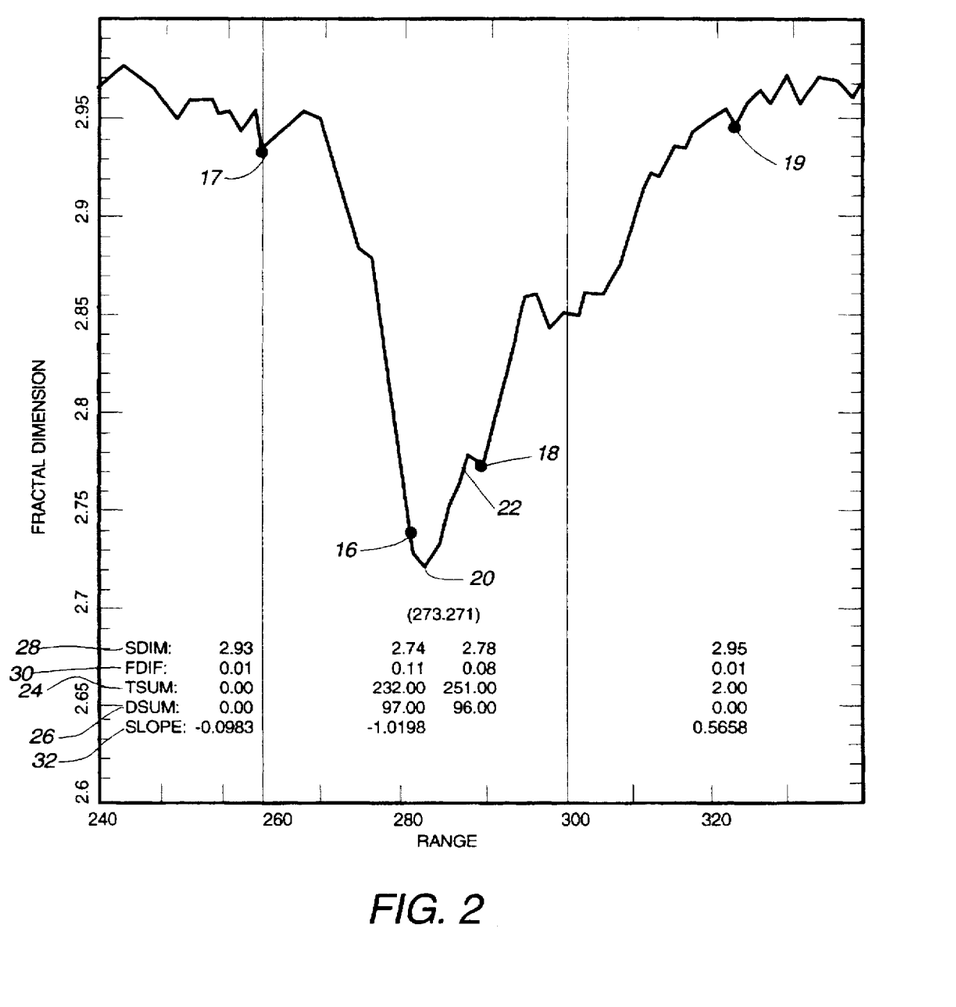
FIG. 2 shows the comparison of fractal features from four points across a strong target in an image.

The usefulness of using fractal features to characterize images is shown in FIGS. 1 and 2 which are derived from the same image. The differences in fractal dimension value and the fractal feature values derived from them between FIG. 1's image background and FIG. 2's target show that fractal dimension and higher order fractal features are useful parameters for target discrimination. Fractal dimension values, Sdim, are plotted along the y-axis and range along the x-axis in both Figures. FIG. 1 shows the values of some fractal features for a background area. The chosen center point 1 in the x direction is identified with a black circle. A small area is formed around this point and the fractal characteristics within this area are compared to three other background areas in the original image, taken along a horizontal line drawn through the center point. The three points 2, 3, and 4 are denoted by three empty circle symbols and their fractal feature values are calculated. Fractal feature values for the four points are located directly below each circle. For these four areas of image background, the small box fractal dimension Sdim 6 has approximately the same value (about 2.95) at all four points of measurement. The difference, Fdif 8, between the big box and small box fractal dimensions is near zero for all four points. The Slope 10 is also small, as the positive and negative fluctuations in background intensity are about equal in magnitude. The values of Tsum 12 and Dsum 14 are zero, as they should be for a non-target.

FIG. 2 shows an area of image around a target. The large dip in the center represents the target highlight 20 and the smaller dip just to its right is the target shadow 22. Again, the center of the target is denoted by a solid black circle 16 and the three empty circle symbols 17, 18, and 19 represent other points of measurement from the original image, taken along a horizontal line drawn through the target. This invention classifies targets by their highlights, not by their shadows. In FIG. 2, the values of Tsum 24 for the two areas 16 and 18 in the center are above 200; the values for the two adjacent areas 17 and 19 are zero and two. The values of Dsum 26 for the two areas 16 and 18 in the center are near 100 as compared to zero for the two adjacent areas 17 and 19. These large differences are indicative of a strong target. The values of Sdim 28 for the two center areas 16 and 18 are smaller than the values for the two adjacent areas 17 and 19, just as they should be, since the target in this case is a mine, and man-made objects, like a mine with its smooth surface and definite shape, will be less fractal-like in nature, thus having a lower fractal dimension. The values of Fdif 30 for the two center areas 16 and 18 are larger than the values for the two adjacent areas 17 and 19, again just as they should be, since the fractal dimension difference between a small box and a large box will be more pronounced for a target than a non-target. The absolute value of Slope 32 for the center area 16 is larger than for the two adjacent areas 17 and 19. The center slope also is negative, a requirement for classification.

Figure 3A:
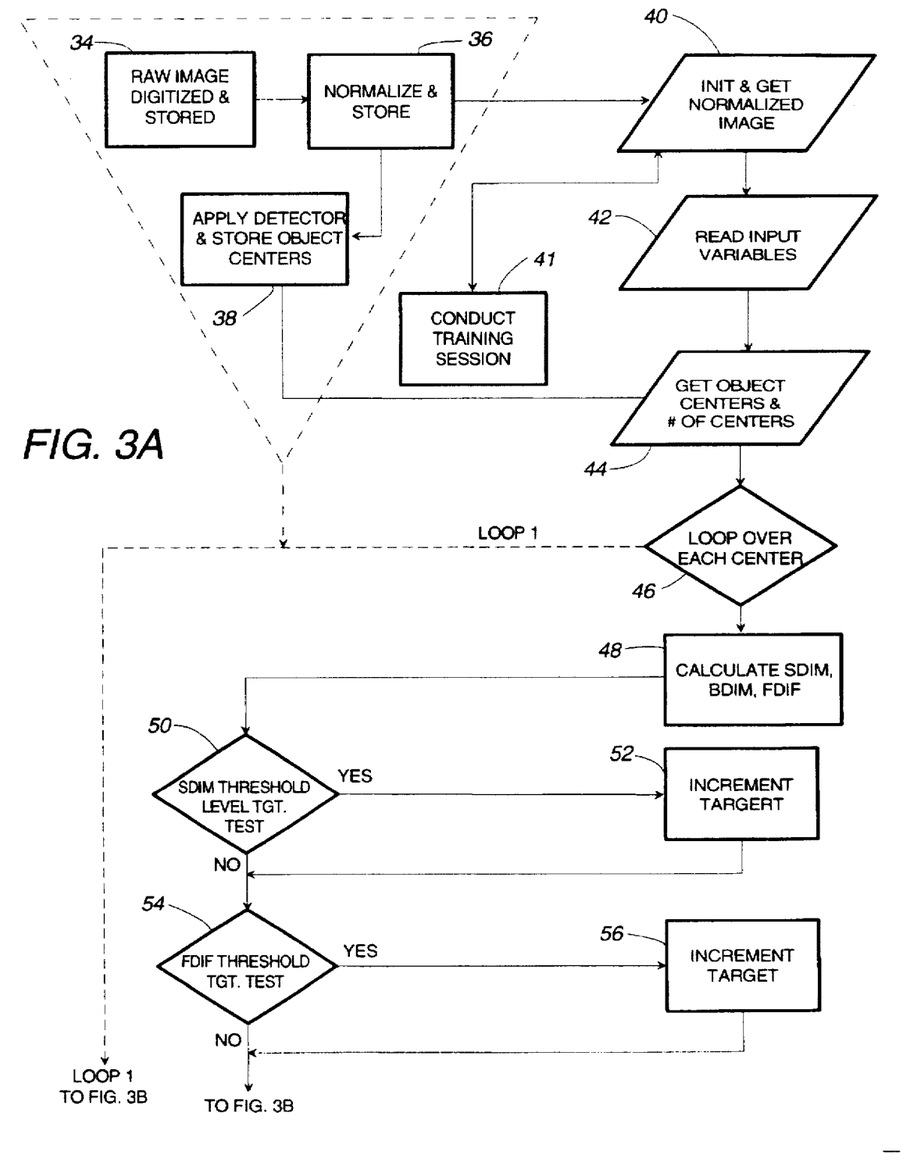
Figure 3B:
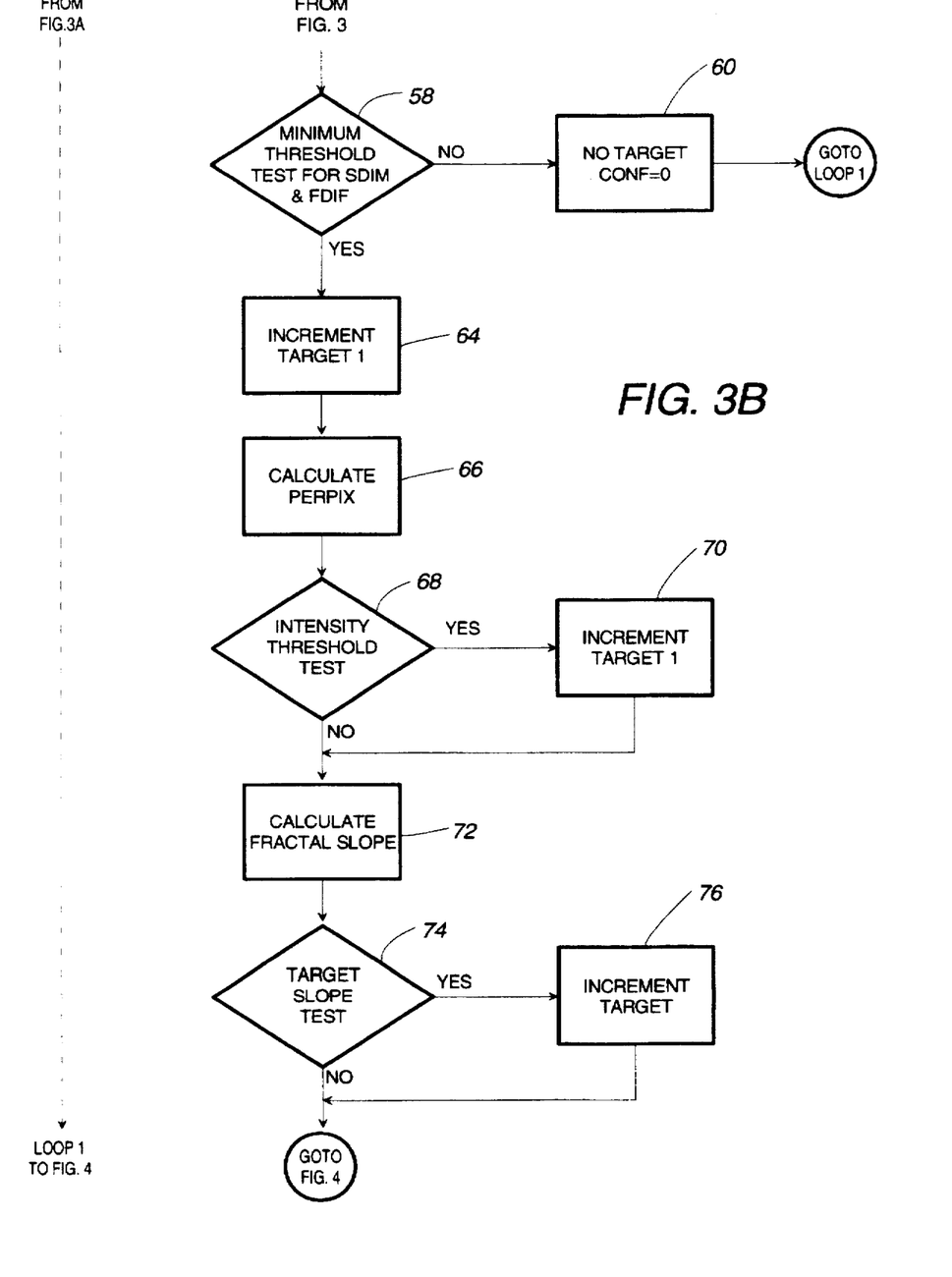
Figure 4:
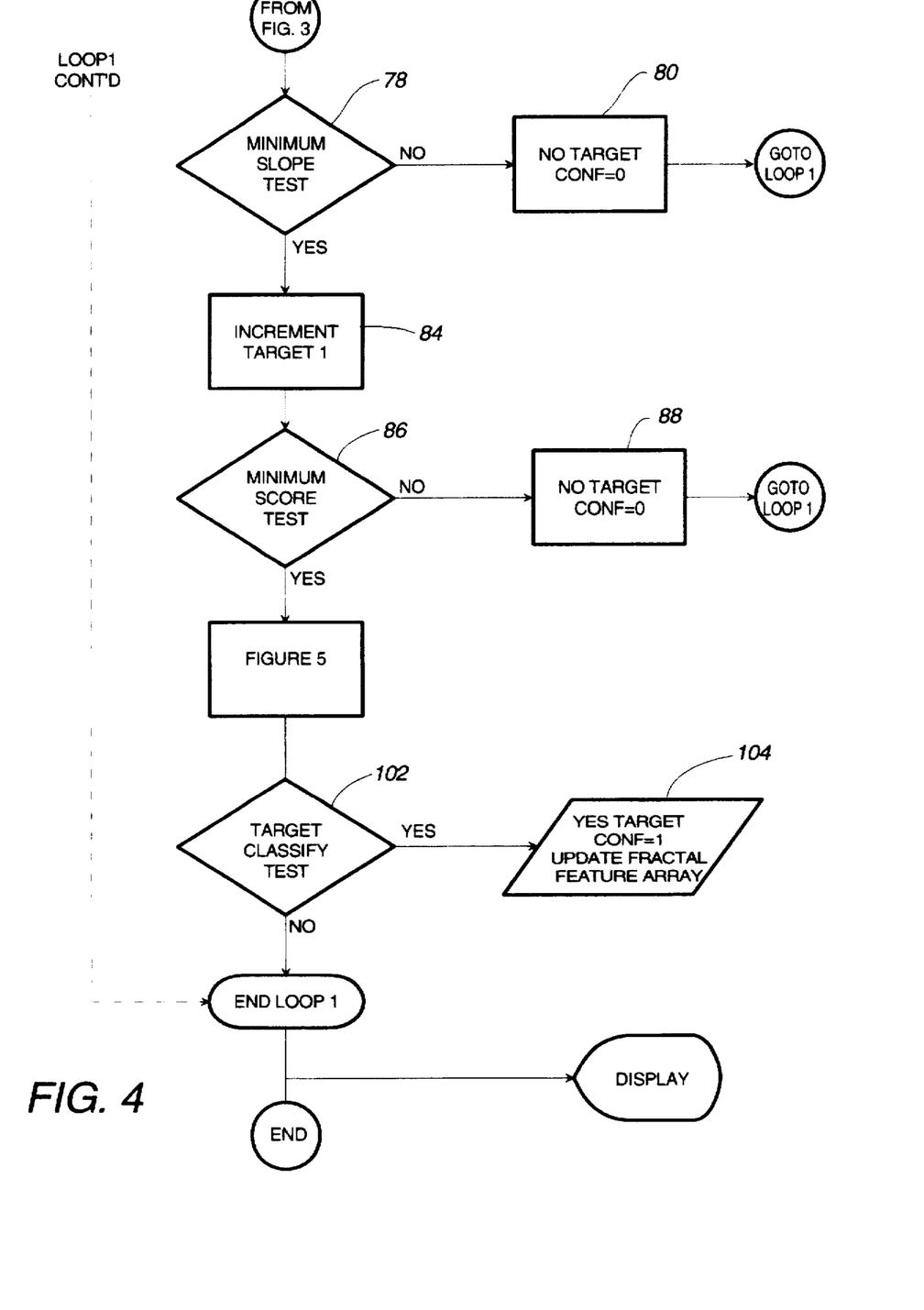
FIG. 4 is a continuation of a simplified flow chart of this invention.

With reference to FIGS. 3 and 4, the present invention is shown in a flow chart. Before this invention is used on an image, certain steps must be completed. A raw image, consisting of analog data must be digitized and stored 34. The image must consist of pixels, each with its own intensity level valued between 0 and 255, inclusive. The image is normalized using the procedure described earlier, and stored again 36. The normalized image is processed by a detection method, also described above, that identifies possible targets and stores their center coordinates 38. The classification method is then ready to start. All filenames, arrays, and parameters are initialized 40 and an entire image consisting of normalized data 36, is inputted also at 40 into a computer by any means. Then input variables are read into the method at 42. These variables are: small fractal box size (DX,DY) where DX is the radius of the small box in the x direction and DY is the radius of the small box in the y direction; big fractal box size (BDX, BDY) where BDX is the radius of the big box in the x direction and BDY is the radius of the big box in the y direction; significant fractal difference threshold SIGNDIFF; small box fractal dimension minimum threshold MINSDIM and maximum threshold MAXSDIM; big box fractal dimension minimum threshold MINBDIM and maximum threshold MAXBDIM; fractal difference minimum threshold MINFDIF; small box fractal dimension minimum slope MINSLOPE and small box fractal dimension less minimum slope LESSMINSLOPE; MAXPERCENT, the maximum percentage of pixels allowed to be above the maximum allowable pixel intensity threshold MAXINTEN; small box fractal dimension distribution sum minimum threshold MINTSUM, small box fractal dimension distribution sum median threshold MIDTSUM, and maximum threshold MAXTSUM; fractal difference distribution sum minimum threshold MINDSUM; minimum TARGET score MINTARGET; and minimum and maximum TARGET1 scores, MINTARGET1 and MAXTARGET1, respectively. The numerical values assigned to these variables 42 will be different for other image data sets and must be determined for each new data set during a training session 41 completed before running the classification method.

Referring back to FIG. 3, an object detector 38 is called by 44. The number of detected objects found and their locations 38 are passed to the classification method and stored at 44. Any detector can be used, as long as it provides this invention with the pixel-referenced center coordinates of areas of the inputted image 36 which exhibit appropriate characteristics meriting closer examination. Appropriate characteristics for this embodiment were expected size and brightness. The locations of detected objects consist of paired coordinates, corresponding to x and y axes on the image, that represent center coordinates ($X_c$, $Y_c$), in pixels, of each detected object in the normalized image 36. The fractal feature array is filled with all of the detected object centers (Feature Numbers 1 and 2, respectively, in Table 1). The next step, using Loop 1, is to loop over each detected object center 46, one at a time, doing calculations and applying several threshold tests, to determine if the object is a target or a non-target.

Figure 6:
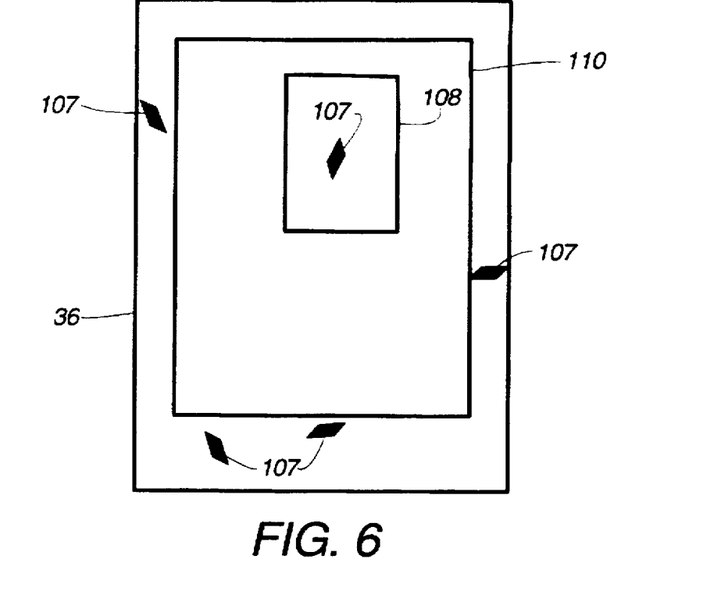
FIG. 6 is a drawing showing the placement of a small fractal box and a big fractal box around a detected object center.

FIG. 6 is a representation of image 36 showing several detected object centers, as found by the detector 38. Shown in FIG. 6 is the formation of a small fractal box 108 and a big fractal box 110 around one detected object center 107 ($X_c$, $Y_c$). (Rectangular boxes were chosen for this embodiment to simplify calculations but any shape could be used.) The sizes of the small box and big box must be determined during a training session 41 completed before this classification method is run. If not enough pixels are included in the boxes, not all of the object will be included in the boxes, and if too many pixels are included in the boxes, the average intensity of the object is diminished because of included background pixels. The dimensions of the small box are (DX, DY), making the size of the small fractal box 108 ($X_c \pm DX$, $Y_c \pm DY$). The dimensions of the big box are (BDX,BDY), so the big fractal box 110 size is ($X_c \pm BDX$, $Y_c \pm BDY$).

The next step 48 in FIG. 3A is to calculate the small box fractal dimension Sdim, the big box fractal dimension Bdim, and the fractal dimension difference Fdif (Feature Numbers 8, 7, and 5, respectively, in Table 1). A fractal box of given size is applied to a portion of the image and pixel values within each box are converted from the original intensities in the normalized image to pixel intensities that represent fractal dimension values. The method of image fractalization was described above. The centers of the small box and the big box are placed over a detected object center, fractalizing only the areas within the boxes. Only limited fractalization is done because the classification method is interested only in areas of the image containing detected objects, so there is no reason to fractalize the entire image. Referring to FIG. 6, the center of the small fractal box 108 is placed over the detected object center 107 defining the size of the area to be fractalized. The small box fractal dimension Sdim is calculated 48 using equations (1) through (5) above and a fractal dimension $D_f$ is assigned to this area. The process for calculating the big box fractal dimension Bdim 48 using the big fractal box 110 is identical. The fractal difference Fdif for this area is then calculated at 48 by subtracting Sdim from Bdim.

The rest of the method involves classification thresholding to determine which detected objects are sought targets and which are non-targets. Classification thresholding for detected objects is done in two stages: (1) minimum thresholding for object acceptance using the counter TARGET1 and (2) thresholding for target classification using the counter. The detected object must pass four minimum threshold tests. Detected objects that do not pass all four tests are rejected (classified as non-targets) and assigned a confidence value (Feature 9 in Table 1) of zero. For objects that do pass, the variable TARGET1 is incremented by one for each test passed. The detected object must also pass two out of three more precise tests. For each precise test passed, the variable TARGET is incremented by one. Objects that pass all four minimum threshold tests and pass at least two out of three precise tests are tentatively identified as targets and assigned a confidence value (Feature 9 in Table 1) of one.

The four minimum threshold tests and the three precise tests are intermixed in the classification method. Referring to FIG. 3A, after Sdim, Bdim, and Fdif are calculated at 48, the small box fractal dimension Sdim is subjected to a threshold level target test at 50 (precise test number 1). If the value of Sdim falls within threshold limits, that is if MINSDIM $\leq$ Sdim $\leq$ MAXSDIM is true, then the value of the variable TARGET is incremented by one at 52. The purpose of this test at 50 is that from the training session conducted prior to running this method, it was determined that the value of the small box fractal dimension for the type of target sought would fall between a minimum and maximum threshold. This test at 50 eliminates certain non-targets right from the start. Whether 50 is true or false, the method moves to the next test at 54. The fractal difference threshold target test at 54 (precise test number 2) is MINBDIM<Bdim $\leq$ MAXBDIM and Fdif $\geq$ SIGNDIFF. When both conditions are true, the value of TARGET is incremented by one at 56. This test at 54 determines that an object of some kind is definitely present and not just part of the background. At 54, whether both conditions are true or one or both are false, the method moves on to the next test at 58. A minimum threshold test at 58 is applied to the small box fractal dimension Sdim and the fractal difference Fdif (minimum threshold test number 1). This test at 58 looks at the minimum fractal feature values needed for a detected object to qualify as a possible target. If either or both of the conditions at 58 Sdim>MINBDIM and Fdif $\geq$ MINFDIF are false, the detected object is classified as a non-target at 60, the confidence level variable Conf (Feature 9 in Table 1) is set to zero at 60, and Loop 1 is started again at 46 for another detected object center. If test 58 is true however, the variable TARGET1 is incremented by one at 64 and the variable Perpix is calculated at 66. Perpix (Feature 10 in Table 1) is the percentage of pixels, in the area defined by the small fractal box when centered on the detected object center, whose intensities are greater than or equal to the maximum allowable intensity level, MAXINTEN. The number of pixels within this defined area whose intensities are greater than or equal to MAXINTEN are summed, and divided by the total number of pixels in the defined area 66.

Figure 7:
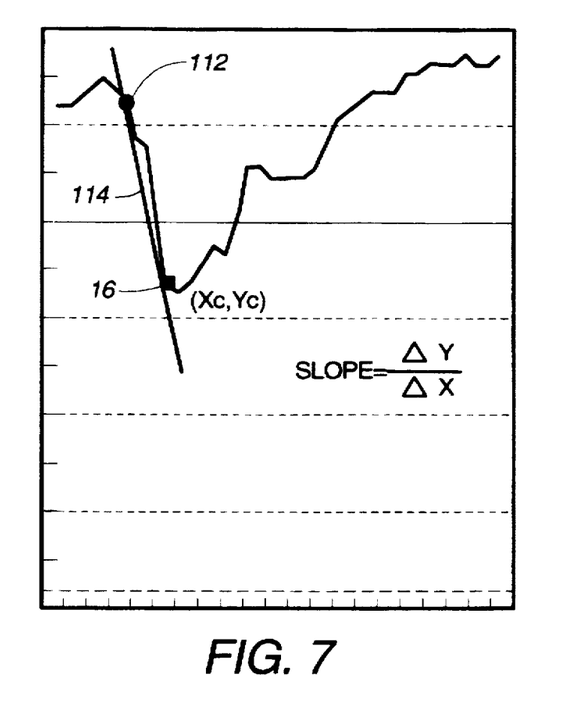
FIG. 7 is a drawing showing the two points on an image used to calculate the slope of the area between them.

Referring to FIG. 3B, the next test at 68 applies an intensity threshold to the variable Perpix (minimum threshold test number 2). If more than a certain percentage of pixels exhibit intensities greater than or equal to the preset maximum intensity MAXINTEN, it means that the object in the defined area is probably image clutter and not a sought target. The calculated percentage Perpix, must be less than a preset maximum allowable percentage, MAXPERCENT. If the condition at 68 Perpix<MAXPERCENT is true, the value of TARGET1 is incremented by one at 70. Whether the test at 68 is true or false, the method then goes on to calculate the fractal slope at 72 (Feature 6 in Table 1), which is the change in the small box fractal dimension divided by the change in range. FIG. 7, which reproduces part of FIG. 2, shows how this calculation is performed. Values of the fractal dimension Sdim are listed along the y-axis and range is along the x-axis. The value of Sdim at a second point 112 ($X_c$−20, $Y_c$) and at the detected object center 16 ($X_c$, $Y_c$) are used for the calculation of slope 114. Their numerical difference is calculated and divided by the accompanying change in range, yielding the slope, as shown in Equation 6.

$$\text{Slope} = \frac{Sdim(X_c - 20, Y_c) - Sdim(X_c, Y_c)}{\text{Number of range cells} \times 0.01} \quad (6)$$

The method then performs the target slope test 74 (precise test number 3), Slope≦MINSLOPE. The target slope test 74 determines if the value of Slope 114 is both negative and steep enough, that is, large enough, to even consider qualifying the object as a possible target. Shallower, flat lines indicate background, while steeper, more sloped lines indicate targets. If test 74 is true, the variable TARGET is incremented by one at 76. Whether 74 is true or false, the method moves on to the next test 78, the minimum slope test (minimum threshold test number 3), Slope≦LESSMINSLOPE, as shown in FIG. 4. This test 78 determines if the line is steep enough to tentatively qualify the object as a target. If Slope can pass test 74, it will definitely pass test 78. However, if Slope fails test 74, it still has a chance of passing test 78. If 78 is false, the detected object is classified as a non-target 80, the confidence level variable Conf (Feature 9 in Table 1) is set to zero at 80, and Loop 1 is started again at 46 for another detected object center. If 78 is true, the variable TARGET1 is incremented by one at 84 and the minimum score test 86, TARGET≧MINTARGET and TARGET1≧MINTARGET1, is performed. If these scores are not yet high enough to pass the minimum score test 86, it means that the detected object did not pass enough of the previous tests and is probably a non-target. For the method to continue, the TARGET1 score must already be 3 and the TARGET score must already be at least 2. So, if the minimum score test at 86 is false, the detected object is classified as a non-target at 88, the confidence level variable Conf (Feature 9 in Table 1) is set to zero at 88, and Loop 1 is started again at 46 for another detected object center. If test 86 is true, the distribution sums of the small box fractal dimension Tsum and the fractal difference Dsum are calculated, as explained below.

Figure 5A:
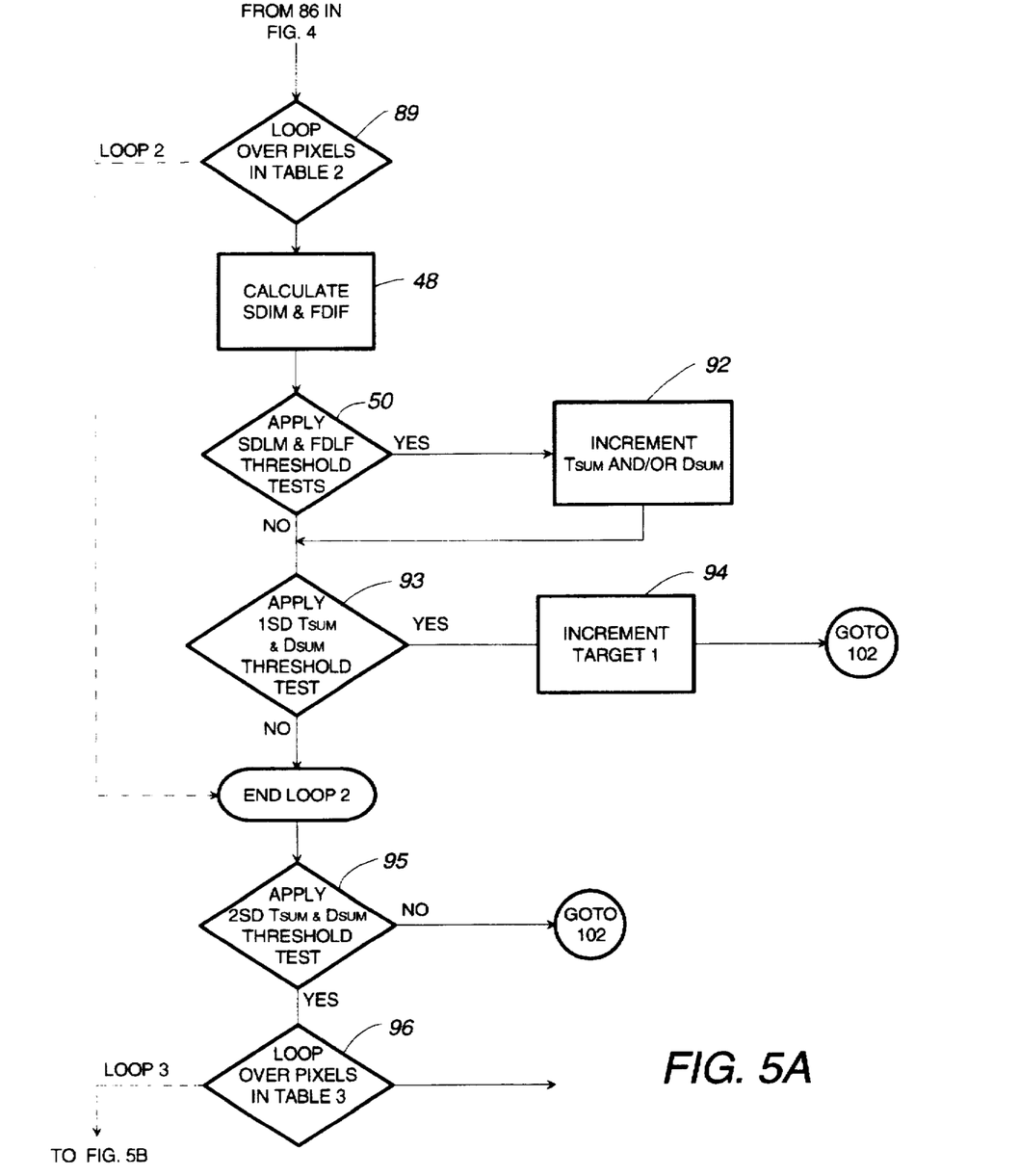
Figure 5B:
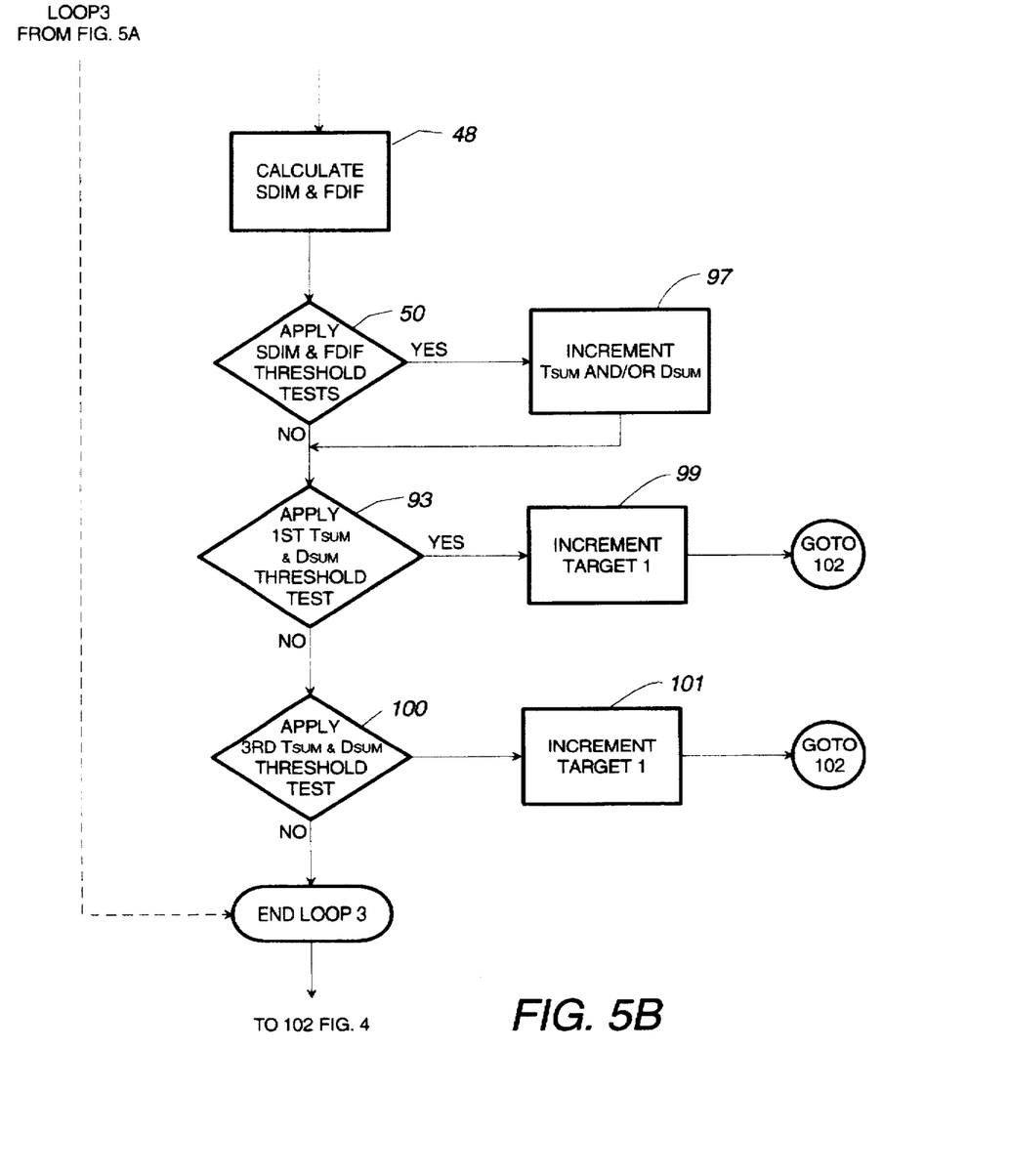

The next group of tests shown in FIG. 5 are the most difficult and the most novel tests in this target classification method. The small box fractal dimension distribution sum Tsum and the fractal difference distribution sum Dsum (Features 3 and 4 in Table 1) are calculated for an area around the detected object center. These distribution calculations look at the sustainability of the target, that is, if you look to the right or left or up or down of the ($X_c$, $Y_c$) detected object center, is a target still present ? Tsum represents the number of times the small box fractal dimension Sdim lies within dimension thresholds. Dsum represents the number of times the fractal dimension difference Fdif lies within difference thresholds. The distribution sums Tsum and Dsum should be near zero for background areas and have a large value over target areas.

An offset matrix, Table 2, is generated to speed the computation of Tsum and Dsum. Pixel #2 in Table 2 is the detected object center ($X_c$, $Y_c$). Tsum and Dsum distributions are calculated by sequentially forming a small fractal box and big fractal box (same sizes as used before) around each pixel in Table 2, starting at pixel #1. The procedure is shown in more detail in FIGS. 5A and 5B. Loop 2 is used to loop 89 through pixels #1 through #80 in Table 2. Starting at pixel #1, the small fractal box 108 and big fractal box 110 are co-located with pixel #1 and the small box fractal dimension Sdim 48 and fractal difference Fdif 48 are calculated in the same way as before. Then Sdim's threshold level target test So and Fdif's fractal difference threshold target test 54 are used. Sdim's threshold level target test 50 is applied and Tsum is incremented by one 92 when the small box fractal dimension Sdim is equal to or lies between a minimum and maximum value, that is MINSDIM≦Sdim≦MAXSDIM. Fdif's fractal difference threshold target test 54 is applied and Dsum is incremented by one at 92 when the big box fractal dimension Fdif is equal to or lies between a minimum and maximum value and is greater than or equal to the significant difference threshold, that is MINBDIM<Bdim≦MAXBDIM and Fdif≧SIGNDIFF.

TABLE 2

|    |    |    | 71 | 72 | 73 | 74 | 75 |    |    |    |
|----|----|----|----|----|----|----|----|----|----|----|
|    |    |    | 46 | 47 | 48 | 49 | 50 | 60 |    |    |
| 70 | 45 | 35 | 21 | 22 | 23 | 24 | 25 | 30 | 40 | 65 |
| 69 | 44 | 34 | 11 | 12 | 13 | 14 | 15 | 29 | 39 | 64 |
| 68 | 43 | 33 | 1  | 2  | 3  | 4  | 5  | 28 | 38 | 63 |
| 67 | 42 | 32 | 6  | 7  | 8  | 9  | 10 | 27 | 37 | 62 |
| 66 | 41 | 31 | 16 | 17 | 18 | 19 | 20 | 26 | 36 | 61 |
|    | 51 | 52 | 53 | 54 | 55 | 56 | 57 | 58 | 59 |    |
|    |    |    | 76 | 77 | 78 | 79 | 80 |    |    |    |

A test at 93 (minimum threshold test number 4, first configuration) is performed after each Tsum and Dsum calculation, that is, after each pixel in Table 2 has been tested. The test 93 states: Tsum is greater than or equal to a minimum and Dsum is greater than or equal to a minimum, that is Tsum≧MINTSUM and Dsum≧MINDSUM. If these conditions are true, the detected object is tentatively declared a target, TARGET1 is incremented by one at 94, no further computation is necessary, Loop 2 ends, and the method moves on to the target classify test at 102. If test 93 fails, then Loop 2 continues using pixel #2. Again Sdim and Fdif are calculated, as centered on pixel #2, Tsum and Dsum are incremented if Sdim and Fdif pass their respective threshold tests, and the Tsum and Dsum threshold test 93 is applied. The testing of pixels either continues through pixel #80 in this manner or stops, ending Loop 2 when test 93 is true. By ordering the process in this way, stronger targets fall out quickly while weaker targets require more computation, thus increasing the speed of the method.

If test 93 was never found to be true and testing continues through pixel #80, then a different test 95 is performed because the detected object may simply be a weak target. Test 95 (minimum threshold test number 4, second configuration) states: Tsum is greater than or equal to a median value and Dsum is less than a minimum, that is Tsum≧MIDTSUM and Dsum<MINDSUM. If test 95 is false, all computations stop and the method moves to test 102. If test 95 is true, Tsum and Dsum distribution calculations are continued using Loop 3. This gives a weaker object a second chance to be tentatively declared a target. Table 3 is another offset matrix and is simply a continuation of Table 2 for more outlying areas. Testing is again completed sequentially, using the same steps as before, looping 96 through pixels #1 through #40 in Table 3. The only change from Loop 2 is the use of Tsum and Dsum test 100 in addition to test 93.

TABLE 3

|    | 11 | 7 | 3 |   |       |   |   |   |    |    |    |    |
|----|----|----|----|----|-------|----|----|----|----|----|----|----|
| 30 | 10 | 6 | 2 | 0 | 0     | 0 | 0 | 0 | 16 | 17 | 18 | 38 |
| 28 | 9  | 5 | 1 | 0 | 0     | 0 | 0 | 0 | 0  | 14 | 15 | 36 |
| 27 | 0  | 0 | 0 | 0 | 0     | 0 | 0 | 0 | 0  | 0  | 0  | 34 |
| 24 | 0  | 0 | 0 | 0 | 0     | 0 | 0 | 0 | 0  | 0  | 0  | 32 |
| 23 | 0  | 0 | 0 | 0 | Xc,Yc | 0 | 0 | 0 | 0  | 0  | 0  | 31 |
| 25 | 0  | 0 | 0 | 0 | 0     | 0 | 0 | 0 | 0  | 0  | 0  | 33 |
| 26 | 0  | 0 | 0 | 0 | 0     | 0 | 0 | 0 | 0  | 0  | 0  | 35 |
| 29 | 12 | 0 | 0 | 0 | 0     | 0 | 0 | 0 | 0  | 0  | 19 | 37 |
| 40 | 13 | 8 | 4 | 0 | 0     | 0 | 0 | 0 | 21 | 22 | 20 | 39 |

Starting at pixel #1 in Table 3, Sdim and Fdif are calculated 48, as centered on pixel #1, Tsum and Dsum are incremented 97 if Sdim and Fdif pass their respective threshold tests 50 and 54, and the Tsum and Dsum threshold test 93 is applied. The test 93 (minimum threshold test number 4, first configuration) states: Tsum is greater than or equal to a minimum and Dsum is greater than or equal to a minimum, that is Tsum≧MINTSUM and Dsum≧MINDSUM. If these conditions are true, the detected object is tentatively declared a target, TARGET1 is incremented by one at 99, no further computation is necessary, Loop 3 ends, and the method moves on to test 102. If test 93 fails, then test 100 is applied. Test 100 (minimum threshold test number 4, third configuration) states: Tsum is greater than or equal to a maximum and Dsum is less than a minimum, that is Tsum≧MAXTSUM and Dsum<MINDSUM. If test 100 is false, pixel #2 is tested. If test 100 is true, then TARGET1 is incremented by one at 101, the detected object is tentatively declared a target, however weak, Loop 3 ends, and the method moves on to test 102. The testing of pixels either continues through pixel #40 in this manner or stops, when test 93 or test 100 is true.

Test 102 is the last test for target classification and uses the conditions, TARGET1≧MAXTARGET1 and TARGET≧MINTARGET. If test 102 is true, the detected object is classified as a target at 104, the confidence level variable Conf (Feature 9 in Table 1) is set to one at 104, and the fractal feature array (specifically, the variables Sdim, Bdim, Fdif, Tsum, Dsum, Conf, Slope, and Perpix) is updated at 104. Whether true or false, Loop 1 is repeated at 46 for another detected object center or the program ends if all of the detected object centers initially read in 44 have been processed.

At this point, each of the originally detected objects 44 has been classified as a target or rejected as a non-target. However, some of the positively-classified targets will not be the specific type of object that is being sought, but will be image clutter. So the next step for target classification is to identify which positive-classified objects are actually part of large or extended objects that constitute image clutter. This clutter may have been physical clutter or image clutter (bright areas) caused by other effects such as sensor motion or high reverberation levels. The method used to determine which positive-classified objects are sought targets as opposed to image clutter is the subject of another invention by the same authors.

The numerical values used in this embodiment are as follows: DX=10; DY=8; BDX=20; BDY=16; SIGNDIFF=0.08; MINSDIM=2.6; MAXSDIM=2.87; MINBDIM=2.0; MAXBDIM=2.94; MINFDIF=0.01; MINSLOPE=−0.34; LESSMINSLOPE=−0.20; MAXPERCENT=0.15; MAXINTEN=120; MINTSUM=5; MIDTSUM=60; MAXTSUM=100; MINDSUM=2; MINTARGET=2; MINTARGET1=3; and MAXTARGET1=4.

The structures and methods disclosed herein illustrate the principles of the present invention. The invention may be embodied in other specific forms without departing from its spirit or essential characteristics. The embodiment of the invention described herein is to be considered in all respects as exemplary and illustrative rather than restrictive. Therefore, the appended claims rather than the foregoing description define the scope of the invention. All modifications to the embodiment described herein that come within the meaning and range of equivalence of the claims is embraced within the scope of the invention.

In order to more clearly understand the claims which follow, reference is now made back to Table 1, hereinabove, and to Table 4 which follows:

TABLE 4

| INPUT PARAMETERS | |
|---|---|
| INPUT NAME | INPUT DEFINITION |
| DX | Radius of small box in x direction |
| DY | Radius of small box in y direction |
| BDX | Radius of big box in x direction |
| BDY | Radius of big box in y direction |
| SIGNDIFF | Significant fractal difference threshold |
| MINSDIM | Small box fractal minimum threshold |
| MAXSDIM | Small box fractal maximum threshold |
| MINBDIM | Big box fractal minimum threshold |
| MAXBDIM | Big box fractal maximum threshold |
| MINFDIF | Fractal difference minimum threshold |
| MINSLOPE | Small box fractal dimension minimum slope |
| LESSMINSLOPE | Small box fractal dimension less minimum slope |
| MAXPERCENT | Maximum percentage of pixels allowed greater than maximum allowable pixel intensity threshold, MAXINTEN |
| MAXINTEN | Maximum allowable pixel intensity threshold |
| MINTSUM | Small box fractal dimension distribution sum minimum threshold |
| MIDTSUM | Small box fractal dimension distribution sum median threshold |
| MAXTSUM | Small box fractal dimension distribution sum maximum threshold |
| MINDSUM | Fractal difference distribution sum minimum threshold |
| MINTARGET | Minimum TARGET score |
| MINTARGET1 | Minimum TARGET1 score |
| MAXTARGET1 | Maximum TARGET1 score |

What we now claim as our invention is:

1. A method for discriminating objects such as targets from non-targets or background in a raw analog image which is pre-processed by being digitized and normalized and consisting of pixels, each of which having its intensity level valued between 0 and 255 where zero is black and 255 is white, and then subjected to a detector capable of identifying possible objects of interest based on appropriate characteristics such as size and brightness for further processing, and providing the x and y center coordinates of each such object in said image, said method having filenames, arrays, and parameters, and said method comprising the steps of:

(a) initializing all filenames, arrays, and parameters;

(b) inputting normalized image data of pixel intensities;

(c) entering input variables consisting of the sizes of a large fractal box, a small fractal box and predetermined threshold test levels;

(d) entering the x and y center coordinates of each object detected in said image in the fractal feature array;

(e) calculating Sdim, the small box fractal dimension, Bdim, the big box fractal dimension and Fdif, the magnitude of the dimensional differences of Bdim and Sdim for each detected object center; and (f) subjecting said calculated fractal data for each detected object in each said image to classification thresholding where:
  (1) minimum thresholds for object acceptance using a counter TARGET1; and
  (2) thresholds for target classification using a counter TARGET.

2. The process of claim 1 wherein four minimum threshold tests are performed and must be passed for object acceptance as a possible target.

3. The method of claim 2 wherein the four minimum threshold tests comprise:
  (a) minimum threshold test 1:

Sdim>MINBDIM and Fdif≧MINFDIF, where Sdim is the small box fractal dimension, MINBDIM is the big box fractal dimension minimum threshold, Fdif is the fractal dimension difference, and MINFDIF is the fractal difference minimum threshold;

(b) minimum threshold test 2:

Perpix<MAXPERCENT, where Perpix is the percentage of pixels within the small fractal box above the pixel intensity threshold and MAXPERCENT is maximum percentage of pixels allowed greater than maximum allowable pixel intensity threshold, MAXINTEN;

(c) minimum threshold test 3:

Slope≦LESSMINSLOPE, where Slope is the average slope of the small box fractal dimension in the vicinity of the detected object less the minimum slope;

(d) minimum threshold test 4:

(1) first configuration
    Tsum≧MINTSUM where Tsum is the small box fractal dimension distribution sum and MINTSUM is the small box fractal dimension distribution sum minimum threshold; and Dsum≧MINDSUM, where Dsum is the big box and small box fractal dimension difference distribution sum and MINDSUM is the fractal difference distribution sum minimum threshold;

(2) second configuration
    Tsum≧MIDTSUM and Dsum<MINDSUM where Tsum is the small box fractal dimension distribution sum and MIDTSUM is the small box fractal dimension distribution sum median threshold; Dsum is the big box and small box fractal dimension difference distribution sum and MINDSUM is the fractal difference distribution sum minimum threshold; Tsum and Dsum calculations continue, and (3) third configuration
    Tsum≧MAXTSUM and Dsum<MINDSUM where Tsum is the small box fractal dimension distribution sum; MAXTSUM is the small box fractal dimension distribution sum maximum threshold; Dsum is the big box and small box fractal dimension difference distribution sum and MINDSUM is the fractal difference distribution sum minimum threshold.

4. The process of claim 3 wherein for each minimum threshold test passed by a detected object, a variable TARGET1 is incremented by one.

5. The process of claim 1 wherein the thresholds for target classification are in three precise tests applied to each detected object.

6. The method of claim 5 wherein the three precise tests comprise:
  (a) precise test 1:
    MINSDIM≦Sdim≦MAXSDIM for elimination of certain non-targets certain non-targets where MINSDIM is a small box fractal minimun threshold; Sdim is the small box fractal dimension, and MAXSDIM is the small box fractal maximun threshold (b) precise test 2:
    MINBDIM<Bdim≦MAXBDIM and Fdif≧SIGNDIFF indicates that an object of some kind is definitely present and not just background; where MINBDIM is the big box fractal dimension minimum threshold; Bdim is the big box fractal dimension; MAXBDIM is the big box fractal maximum threshold; Fdif is the fractal dimension difference, and SIGNDIFF is significant fractal difference threshold and (c) precise test 3:
    Slope≦MINSLOPE to determine if the slope is both negative and steep enough to consider qualifying the object as a possible target, where slope is the average slope of the small box fractal dimension in the vicinity of the detected object and MINSLOPE is small box fractal dimension minimum slope.

7. The process of claim 6 wherein for each precise test passed, the variable TARGET is incremented by one.

8. The method of claim 1 wherein said minimum thresholds for object acceptance using TARGET1 comprise four minimum threshold tests and said thresholds for target classification using the counter TARGET comprise three precise tests.

9. The process of claim 8 wherein objects that pass four minimum threshold tests and at least two out of three precise tests are tentatively identified as targets and assigned a confidence value of one.

10. A method for discriminating objects such as targets from non-targets or background in a raw analog image which is pre-processed by being digitized and normalized and consisting of pixels, each of which having its intensity level valued between 0 and 255 where zero is black and 255 is white, and then subjected to a detector capable of identifying possible objects of interest based on appropriate characteristics such as size and brightness for further processing, and providing the x and y center coordinates of each such object in said image, said method having filenames, arrays, and parameters, and said method comprising the steps of:
  (a) initializing all filenames, arrays, and parameters;
  (b) inputting normalized image data;
  (c) entering input variables consisting of size of a large and size of a small fractal box and predetermined threshold levels for the input parameters, as defined in Table 4 hereinabove and as identified below comprising:
    (1) SIGNDIFF, (2) MINSDIM, (3) MAXSDIM, (4) MINBDIM, (5) MAXBDIM, (6) MINFDIF, (7) MINSLOPE, (8) LESSMINSLOPE, (9) MAXPERCENT, (10) MAXINTEN, (11) MINTSUM, (12) MIDTSUM, (13) MAXTSUM, (14) MINDSUM, (15) MINTARGET, (16) MINTARGET2, (17) MAXTARGET1.
  (d) entering the x and y center coordinates of each object detected in said image in the fractal feature array;
  (e) calculating Sdim, the small box fractal dimension, Bdim, the big box fractal dimension and Fdif, the magnitude of the dimensional differences of Bdim and Sdim for each detected object center;

(f) testing Sdim, the small box fractal dimension, to a threshold level target test for a predetermined type of target MINSDIM≦Sdim≦MSDIM where MINSDIM is the small box fractal minimum threshold and MAXSDIM is the small box fractal maximum threshold, such that if true, TARGET is incremented by 1;

(g) performing the fractal difference threshold target test such that if MINSDIM≦Sdim≦MAXSDIM and Fdif≧SIGNDIFF are true, where Fdif is the fractal dimension difference, the value of TARGET is incremented by 1 to establish that an object of some kind and not just background is present;

(h) applying a minimum threshold test to look for the minimum fractal feature values to detect an object qualifying as a possible target such that, if Sdim>MINBDIM or Fdif≧MINFDIF are false, where MINBDIM is the big box fractal minimum threshold, the detected object is classified as a non-target and the confidence variable Conf is set to zero and another detected object center is selected for processing, but the test is true the variable TARGET1 is incremented by one and the variable Perpix, the percentage of pixels within the small fractal box above the pixel intensity threshold, is calculated;

(i) applying an intensity threshold to the variable Perpix such that if Perpix<MAXPERCENT is true, where MAXPERCENT is the maximum percentage of pixels allowed greater than maximum allowable pixel intensity threshold MAXINTEN, the value of TARGET1 is incremented by one meaning that the object in the defined area is probably a target and not image clutter;

(j) calculating fractal slope Slope, the average slope of small box fractal dimension in the vicinity of the detected object;

(k) performing a target slope test Slope≦MINSLOPE, the small box fractal dimension minimum slope, to determine if value of Slope is both negative and steep enough to qualify object as possible target and if true incrementing TARGET by one;

(l) performing minimum slope test Slope≦LESSMINSLOPE, the small box fractal dimension less minimum slope, to tentatively qualify the object as a target, if true and, incrementing TARGET1 by one, if not true, classifying object as non-target, setting confidence level variable Conf to zero, and going to next detected object center coordinates;

(m) performing the minimum score test TARGET≧MINTARGET≧2 and TARGET1≧MINTARGET1≧3 if minimum slope test is true, such that, if the result is false, the detected object is classified as a non-target, the confidence level variable Conf is set to zero, and the next detected object center coordinates are selected for processing, or if the result is true, distribution sums of the small box fractal dimension distribution sum Tsum and the fractal difference sum Dsum are calculated;

(n) calculating the small box fractal dimension distribution sum Tsum and the fractal difference distribution sum Dsum for an area around the detected object center to determine target sustainability using the offset matrix of numbered pixels

|    |    |    | 71 | 72 | 73 | 74 | 75 |    |    |    |
|----|----|----|----|----|----|----|----|----|----|----|
|    |    | 46 | 47 | 48 | 49 | 50 | 60 |    |    |    |
| 70 | 45 | 35 | 21 | 22 | 23 | 24 | 25 | 30 | 40 | 65 |
| 69 | 44 | 34 | 11 | 12 | 13 | 14 | 15 | 29 | 39 | 64 |
| 68 | 43 | 33 | 1  | 2  | 3  | 4  | 5  | 28 | 38 | 63 |
| 67 | 42 | 32 | 6  | 7  | 8  | 9  | 10 | 27 | 37 | 62 |
| 66 | 41 | 31 | 16 | 17 | 18 | 19 | 20 | 26 | 36 | 61 |
| 51 | 52 | 53 | 54 | 55 | 56 | 57 | 58 | 59 |    |    |
|    |    | 76 | 77 | 78 | 79 | 80 |    |    |    |    | and starting at pixel #1 and sequentially progressing through pixel #80 or until after Sdim, the small box fractal dimension, and Fdif, the fractal dimension difference, are calculated as centered on a pixel, pass their threshold tests MINSDIM≦SDIM≦MAXSDIM and MINBDIM<Bdim≦MAXBdim and Fdif≧SIGNDIFF, and applying a first Tsum Dsum threshold test Tsum≧MINTsum and Dsum≧MINDSUM are true so that processing of pixels ceases, a tentative target is declared, TARGET1 is incremented by one, and processing proceeds to target classification; and (o) applying a second Tsum, small box fractal dimension distribution sum, and Dsum, big box and small box fractal dimension difference distribution sum, threehold test where said first threshold test is false indicating the detected object may be a weak target, where in said second test said Tsum is greater than or equal to a median value Tsum≧MIDTSUM, the small box fractal dimension distribution sum median threshold, and Dsum is less than a minimum Dsum<MINVDSUM, and where if the result is false, the process proceeds to target classification, and where is the result is true Tsum and Dsum, distribution calculations are performed looping through pixels #1 through #40 using the offset matrix of numbered pixels

|    | 11 | 7 | 3 |    |       |   |   |   |    |    |    |    |
|----|----|---|---|----|-------|---|---|---|----|----|----|----|
| 30 | 10 | 6 | 2 | o  | o     | o | o | o | 16 | 17 | 18 | 38 |
| 28 | 9  | 5 | 1 | o  | o     | o | o | o | o  | 14 | 15 | 36 |
| 27 | o  | o | o | o  | o     | o | o | o | o  | o  | o  | 34 |
| 24 | o  | o | o | o  | o     | o | o | o | o  | o  | o  | 32 |
| 23 | o  | o | o | o  | Xc,Yc | o | o | o | o  | o  | o  | 31 |
| 25 | o  | o | o | o  | o     | o | o | o | o  | o  | o  | 33 |
| 26 | o  | o | o | o  | o     | o | o | o | o  | o  | o  | 35 |
| 29 | 12 | o | o | o  | o     | o | o | o | o  | o  | 19 | 37 |
| 40 | 13 | 8 | 4 | o  | o     | o | o | o | 21 | 22 | 20 | 39 |

11. The method of claim 10 wherein the small box fractal dimension distribution sum Tsum and the fractal difference distribution sum Dsum are calculated for an area around the detected object center.

12. The method of claim 10 wherein the distribution sums Tsum and Dsum are near zero for background areas and have a large value over target areas.

13. The method of claim 10 wherein said Tsum distributions are calculated by sequentially forming a small fractal box and a big fractal box of the same sizes entered in step (c), co-located with and around each pixel in the offset matrix starting with pixel #1.

TABLE 2

|    |    |    | 71 | 72 | 73 | 74 | 75 |    |    |    |
|----|----|----|----|----|----|----|----|----|----|----|
|    |    | 46 | 47 | 48 | 49 | 50 | 60 |    |    |    |
| 70 | 45 | 35 | 21 | 22 | 23 | 24 | 25 | 30 | 40 | 65 |
| 69 | 44 | 34 | 11 | 12 | 13 | 14 | 15 | 29 | 39 | 64 |
| 68 | 43 | 33 | 1  | 2  | 3  | 4  | 5  | 28 | 38 | 63 |

TABLE 2-continued

| 67 | 42 | 32 | 6  | 7  | 8  | 9  | 10 | 27 | 37 | 62 |
| 66 | 41 | 31 | 16 | 17 | 18 | 19 | 20 | 26 | 36 | 61 |
|    | 51 | 52 | 53 | 54 | 55 | 56 | 57 | 58 | 59 |    |
|    |    |    | 76 | 77 | 78 | 79 | 80 |    |    |    |

14. The method of claim 10 wherein the minimum threshold test 4 is performed after each small box fractal dimension distribution sum Tsum and big box and small box fractal dimension difference distribution sum Dsum calculation after each pixel is tested.

15. The method of claim 10 wherein the small fractal box and big fractal box can be any 2-dimensional shape.

16. The method of claim 10, step (e) wherein the fractal dimension difference Fdif is calculated by subtracting the small box fractal dimension Sdim from the big box fractal dimension Bdim.

17. The method of claim 10, step (e) wherein after the three calculations are performed, three threshold tests are performed.

18. The method of claim 17 wherein for the first of said three tests, the small box fractal dimension Sdim threshold level target test (a precise threshold test), the value of the small box fractal dimension Sdim must be greater than or equal to a minimum value and must be less than or equal to a maximum value.

19. The method of claim 17 wherein for the second of said three tests, the fractal dimension difference Fdif threshold target test (a precise threshold test), the value of the big box fractal dimension Bdim must be greater than a minimum value and must be less than or equal to a maximum value, and the fractal dimension difference must be greater than or equal to a significant difference.

20. The method of claim 17 wherein for the third of said three tests, the small box fractal dimension Sdim and fractal difference minimum threshold test (a minimum threshold test), the small box fractal dimension Sdim must be greater than a minimum value and the fractal difference Fdif must be greater than or equal to a minimum value.

21. The method of claim 10, step (h) wherein after calculating the percentage of pixels in an area formed around one detected object center that have an intensity greater than or equal to a threshold intensity, the percentage is subjected to a threshold test (a minimum threshold test).

22. The method of claim 21 wherein the percentage of high intensity pixels must be less than a maximum allowable percentage.

23. The method of claim 10, step (i) wherein after calculating the slope of the small box fractal dimension in the vicinity of one detected object center, two slope threshold tests are performed.

24. The method of claim 23 wherein for the first test, the target slope threshold test (a precise threshold test), the slope must be less than or equal to a minimum value.

25. The method of claim 23 wherein for the second test, the minimum slope test, the slope must be less than or equal to an even stricter minimum value (a minimum threshold test).

26. The method of claim 10, step (m) wherein the application of a minimum score test means that two variables used as counters, that is, incremented by one whenever a certain condition is met, are submitted to minimum score tests.

27. The method of claim 26 wherein the first variable TARGET keeps a count of the number of times a precise threshold test is passed.

28. The method of claim 26 wherein the second variable TARGET1 keeps a count of the number of times a minimum threshold test is passed.

29. The method of claim 26 wherein the variable TARGET must be greater than or equal to a minimum value and the variable TARGET1 must be greater than or equal to a minimum value.

30. The method of claim 10, step (n) wherein the calculated values of the distribution sums of the small box fractal dimension and the fractal difference across a preset pattern of pixels, with the detected object center in the center of the pattern, are repeatedly submitted to threshold tests.

31. The method of claim 30 wherein the threshold tests state that the distribution sum of the small box fractal dimension must be greater than or equal to a minimum value and the distribution sum of the fractal difference must be greater than or equal to a minimum value; or, that the distribution sum of the small box fractal dimension must be greater than or equal to a median value and the distribution sum of the fractal difference must be less than a minimum value; or, that the distribution sum Tsum of the small box fractal dimension must be greater than or equal to a maximum value and the distribution sum Dsum of the fractal dimension difference must be less than a minimum value.

32. The method of claim 9 step (f) wherein the application of a final target classification test means that two variables used as counters, that is, incremented by one whenever a certain condition is met, are submitted to minimum score tests.

33. The method of claim 32 wherein the first variable TARGET keeps a count of the number of times a precise threshold test is passed.

34. The method of claim 32 wherein the second variable TARGET1 keeps a count of the number of times a minimum threshold test is passed.

35. The method of claim 32 wherein the variable TARGET must be greater than or equal to a minimum value and the variable TARGET1 must be greater than or equal to a maximum value.

* * * * *